United States Patent
Hong (10) Patent No.: US 12,432,074 B2
(45) Date of Patent: Sep. 30, 2025

(54) DYNAMIC LOADING METHOD AND APPARATUS FOR SIGNATURE ALGORITHM, AND DEVICE AND STORAGE MEDIUM

(71) Applicant: Beijing Bytedance Network Technology Co., Ltd., Beijing (CN)

(72) Inventor: Zilun Hong, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 100 days.

(21) Appl. No.: 18/562,163

(22) PCT Filed: May 23, 2022

(86) PCT No.: PCT/CN2022/094381
§ 371 (c)(1),
(2) Date: Nov. 17, 2023

(87) PCT Pub. No.: WO2023/273693
PCT Pub. Date: Jan. 5, 2023

(65) Prior Publication Data
US 2024/0259215 A1    Aug. 1, 2024

(30) Foreign Application Priority Data
Jun. 30, 2021   (CN) .......................... 202110733971.7

(51) Int. Cl.
*H04L 9/40* (2022.01)
*H04L 9/32* (2006.01)
(52) U.S. Cl.
CPC .................. *H04L 9/3247* (2013.01)
(58) Field of Classification Search
CPC ................................... H04L 9/3247
See application file for complete search history.

(56) References Cited

U.S. PATENT DOCUMENTS 7,834,784 B1 * 11/2010 Zhang ..................... H03M 7/30
                                                       341/51
10,542,003 B1 * 1/2020 Maierean ............ H04L 63/0428
(Continued)

FOREIGN PATENT DOCUMENTS

| CN | 105653933 A | 6/2016 |
|---|---|---|
| CN | 111541542 A | 8/2020 |

(Continued)

OTHER PUBLICATIONS

Office Action for Chinese Patent Application No. 202110733971.7, mailed Apr. 24, 2023, 5 pages.
(Continued)

*Primary Examiner* — Ghodrat Jamshidi
(74) *Attorney, Agent, or Firm* — Astute IP Law Group (57) ABSTRACT

A dynamic loading method and apparatus for a signature algorithm, a device and a storage medium. The method including: obtaining a script corresponding to a dynamic part of a target signature algorithm, where the script comprises at least one script API; encapsulating at least one general API of a static part of the target signature algorithm, where the at least one script API and the at least one general API have a mapping relationship; based on the mapping relationship, combining the script with the static part, so as to generate the target signature algorithm; compiling the target signature algorithm. Therefore, the loading efficiency of the signature algorithm can be improved. In addition, with respect to a whole CDN delivery system, the loading efficiency of signature algorithms in the whole CDN can be increased, such that the efficiency of user access or service adaptation is improved.

15 Claims, 4 Drawing Sheets

(56) References Cited

U.S. PATENT DOCUMENTS

| | | | |
|---|---|---|---|
| 10,867,058 B2* | 12/2020 | Duffy | H04L 63/0823 |
| 12,192,376 B2* | 1/2025 | Lu | H04L 9/3226 |
| 2013/0080888 A1 | 3/2013 | Audet et al. | |
| 2015/0262176 A1* | 9/2015 | Langschaedel | G06Q 20/3678 |
| | | | 705/44 |
| 2016/0188391 A1* | 6/2016 | Ekanadham | G06F 9/547 |
| | | | 719/328 |
| 2016/0364723 A1* | 12/2016 | Reese | G06Q 20/202 |
| 2017/0171172 A1* | 6/2017 | Sullivan | G06F 21/33 |
| 2019/0362344 A1 | 11/2019 | Koeppel | G07C 9/253 |
| 2021/0344512 A1* | 11/2021 | Xu | H04L 63/168 |

FOREIGN PATENT DOCUMENTS

| | | |
|---|---|---|
| CN | 111835523 A | 10/2020 |
| CN | 112434286 A | 3/2021 |
| CN | 112989325 A | 6/2021 |
| CN | 113378095 A | 9/2021 |

OTHER PUBLICATIONS

Office Action received for Chinese Patent Application No. 202110733971.7, mailed Feb. 22, 2023, 6 pages.

International Search Report in PCT/CN2022/094381, mailed Jul. 28, 2022, 4 pages.

* cited by examiner

Fig. 7

DYNAMIC LOADING METHOD AND APPARATUS FOR SIGNATURE ALGORITHM, AND DEVICE AND STORAGE MEDIUM

CROSS-REFERENCE TO RELATED APPLICATION(S)

This application is a U.S. National Stage Application of PCT Application Serial No. PCT/CN2022/094381, filed May 23, 2022, which claims priority to Chinese Application No. 202110733971.7 entitled "a dynamic loading method and apparatus for a signature algorithm, and device and storage medium" and filed on Jun. 30, 2021, the disclosures of which are incorporated herein by reference in their entities.

FIELD

Embodiments of this application relate to the technical field of computers, and in particular, to a method and apparatus of dynamically loading a signature algorithm, and a device and a storage medium.

BACKGROUND

The basic principle of content delivery network (CDN) is to use a wide range of edge servers, i.e., caching servers, and to distribute these edge servers to areas or networks where user's access is relatively concentrated. When a user accesses a website, the user's access is directed, using the global load technology, to the nearest edge server that is working properly, and the edge server responds to the use's request directly, thereby improving the user's access response speed and hit rate.

The process of the user accessing the website may be as follows: the client signs the uniform resource locator (URL) with the secret key (SK) and the signature algorithm, and carries the obtained signature, URL and access key (AK) in the hyper text transfer protocol (HTTP) request. Upon receiving the HTTP request, the edge server corresponding to this client determines the SK corresponding to this AK, and signs the URL with the signature algorithm and this SK, and compares the obtained signature with the signature carried in the HTTP request to verify the authenticity of the URL, and if the URL is authentic, the edge server sends an HTTP response or, when the edge server does not locally store the data required by the user, the edge server sources back to the source station to retrieve the data required by the user.

At present, signature algorithms are implanted into corresponding edge servers in a traditional hard-coded manner. On the one hand, when a certain edge server needs to load a certain signature algorithm, if the signature algorithm is implanted in such a traditional hard-coded manner, then the efficiency of loading the signature algorithm is relatively low. On the other hand, in some scenarios, different clients might adopt different signature algorithms, i.e., clients might need customized signature algorithms. As there is a mass of edge servers in the CDN, if signature algorithms are implanted into edge servers corresponding to such clients that need customized signature algorithms in the traditional hard-coded manner, then low loading efficiency of signature algorithms in the whole CDN is brought, and ultimately, obvious bottlenecks in the efficiency of user's access or service adaptation are caused.

SUMMARY

The present application provides a method and apparatus of dynamically loading a signature algorithm, a device and a storage medium, so that the loading efficiency of the signature algorithm may be increased. Furthermore, from the perspective of the whole CDN delivery system, the efficiency of loading signature algorithms in the whole CDN may be increased, so that the efficiency of user access or service adaptation is improved.

In a first aspect, a method of dynamically loading a signature algorithm is provided, comprising: obtaining a script corresponding to a dynamic part of a target signature algorithm, the script comprising at least one script API; encapsulating at least one general API of a static part of the target signature algorithm, the at least one script API having a mapping relationship with the at least one general API; by combining the script with the static part based on the mapping relationship between the at least one script API and the at least one general API, generating the target signature algorithm; compiling the target signature algorithm.

In a second aspect, an apparatus of dynamically loading a signature algorithm is provided, comprising: a first obtaining module, an encapsulating module, a generating module and a compiling module, wherein the first obtaining module is configured to obtain a script corresponding to a dynamic part of a target signature algorithm, the script comprising at least one script API. The encapsulating module is configured to encapsulate at least one general API of a static part of the target signature algorithm, the at least one script API having a mapping relationship with the at least one general API. The generating module is configured to, by combining the script with the static part based on the mapping relationship between the at least one script API and the at least one general API, generate the target signature algorithm. The compiling module is configured to compile the target signature algorithm.

In a third aspect, an electronic device is provided, comprising: a processor and a memory, the memory used to store a computer program, and the processor configured to call and run the computer program stored in the memory so as to perform a method as described in the first aspect or various implementations thereof.

In a fourth aspect, a computer readable storage medium is provided for storing a computer program, which causes a computer to perform a method as described in the first aspect or various implementations thereof.

In a fifth aspect, a computer program product is provided, including computer program instructions which cause a computer to perform a method as described in the first aspect or various implementations thereof.

In a sixth aspect, a computer program is provided, which causes a computer to perform a method as described in the first aspect or various implementations thereof.

To sum up, with the technical solution of the present application, a script corresponding to the dynamic part of the signature algorithm may be implanted in a hot-pluggable manner on statically compiled software in the edge server, thereby increasing the efficiency of loading the signature algorithm. In addition, from the perspective of the whole CDN delivery system, the efficiency of loading signature algorithms in the whole CDN may be increased, so that the efficiency of user's access or service adaptation is improved.

Furthermore, the method of dynamically loading provided in the present application may be performed before the edge server obtains the HTTP request. That is, the loading process of the target signature algorithm is a preloading process, the encapsulating the at least one general API of the static part of the target signature algorithm as involved in the loading process may be referred to as preloading process, and the compiling the target signature algorithm is also a pre-compiling process. Therefore, the efficiency of loading the signature algorithm may be further increased.

BRIEF DESCRIPTION OF THE DRAWINGS

To more clearly illustrate technical solutions in the embodiments of the present invention, a brief introduction is given below to the accompanying drawings used in the description of the embodiments. Apparently, the accompanying drawings to be described below are merely some embodiments of the present disclosure. Those of ordinary skill in the art may further obtain other figures according to these accompanying drawings without the exercise of any inventive skill.

DETAILED DESCRIPTION OF EMBODIMENTS

A clear and complete description is presented below to the technical solution in the embodiments of the present invention in conjunction with the accompanying drawings. Apparently, the embodiments described herein are merely part rather than all of the embodiments of the present invention. Based on the embodiments of the present invention, all other embodiments obtained by those of ordinary skill in the art without the exercise of any inventive skill fall within the protection scope of the present invention.

It is noteworthy that terms "first", "second" and the like mentioned in the specification and claims as well as the above drawings are only used to distinguish between similar objects, without the need of describing a specific sequence or sequential order. It should be understood that data used as such may interchange in suitable cases, so that the embodiments described herein can be implemented in other sequence than depicted or described herein. In addition, terms "comprise", "have" and their variants are intended to cove non-exclusive inclusion, for example, processes, methods, systems, products or servers comprising a series of steps or units need not to be limited to those clearly listed, but may include other steps or units that are not clearly listed or are inherent to those processes, methods, products or devices.

CDN is a content delivery network built on the network. By relying on edge servers deployed in various places and with the functions of the central platform such as load balancing, content delivery, scheduling, CDN enables users to obtain required content in the vicinity to reduce network congestion and improve the response speed of user access and the hit rate. The core technology of CDN is the content storage and delivery technology.

It should be understood that in this application, the edge server is also referred to as caching server, CDN edge server, CDN caching server, edge node or CDN edge node, etc., and this application is not intended to limit in this regard.

Figure 1:
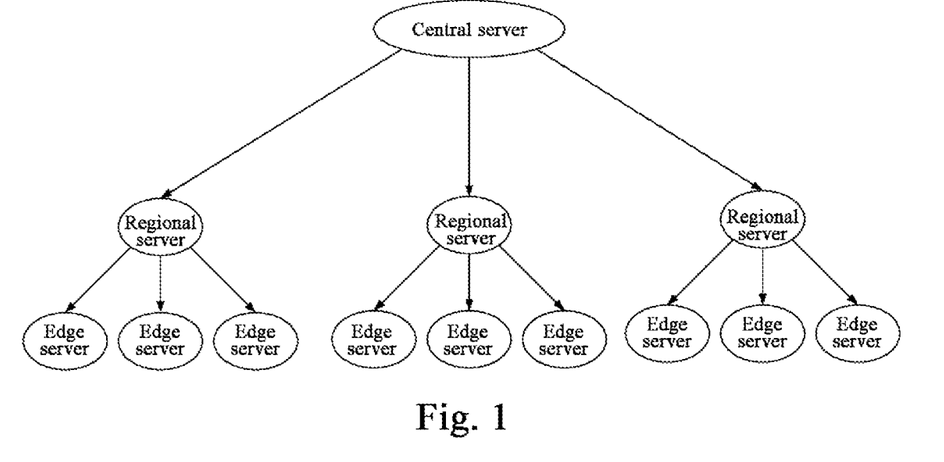
FIG. 1 is an architecture diagram of a CDN delivery system provided by an embodiment of the present application.

As an example, FIG. 1 is an architecture diagram of a CDN delivery system provided by an embodiment of the present application. As depicted, suppose that there are N data centers around the world, multiple caching servers are deployed in these data centers to form a caching cluster system for caching part of data, so that users can proximally access data. Edge servers are numerous and closest to users, but have a small scale and cache less data, so the user might fail to hit. Thus, regional nodes need to be deployed over the edge servers, which have a larger scale than the edge servers and cache more data. There are central servers over the regional servers, which have a more larger scale and cache even more data. If the user still fail to hit, sourcing back to source stations for accessing data must be performed.

It is noteworthy that the CDN delivery system shown in FIG. 1 is merely an example. In fact, the CDN delivery system may comprise: at least one layer of servers. For example, the CDN delivery system only comprises one layer of edge servers, and when users fail to hit, directly sourcing back to source station for accessing data may be performed. For another example, the CDN delivery system comprises one layer of edge servers and one layer of regional servers. When the user fails to hit in the edge servers, the regional servers are accessed to retrieve data; and if the user still does not hit in the regional servers, directly source back to source stations to access data may be performed.

It should be understood that in this application, the regional server is also referred to as regional node, CDN regional server, CDN regional node, etc., and this application is not intended to limit in this regard.

It should be understood that in this application, the central server is also referred to as master node, CDN central server, CDN master node, etc., and this application is not intended to limit in this regard.

It should be understood that the source station may be the World Wide Web (WWW) server.

As described above, the process of the user accessing the website may be as follows: the client signs the URL with the SK and the signature algorithm, and carries the obtained signature, URL and AK in the HTTP request. Upon receiving the HTTP request, the edge server corresponding to the client determines the SK corresponding to the AK, and signs the URL with the signature algorithm and the SK, and compares the obtained signature with the signature carried in the HTTP request to verify the authenticity of the URL, and in response to the URL being authentic, the edge server sends an HTTP response; or, when the edge server does not locally store the data required by the user, the edge server sources back to the source station to retrieve the data required by the user.

It should be understood that the signature algorithm here may be any signature algorithm, such as Hash-based Message Authentication Code (HMAC), Message-Digest Algorithm (MD5), etc., and this application is not intended to limit in this regard.

It should be understood that the above AK is a Public Key (PK).

It should be understood that a URL comprises: a URL includes: a protocol part, a domain name part, a port part, a filename part, an anchor part, and a parameter part. For example, suppose a URL is http://www.aspxfans.com:8080/news/index.asp?boardID=5&ID=24618&page=1#name. The URL's protocol part is "http:", which represents that the page uses the HTTP protocol. A variety of protocols may be used on the Internet, such as HTTP, File Transfer Protocol (FTP), etc., and HTTP is used in this example. "//" following "HTTP" is a delimiter, and the URL's domain name part is "www.aspxfans.com." The IP address may also be used as a domain name in a URL. The virtual directory part ranges from the first "/" after the domain name to the last "/." The virtual directory is not an essential part of a URL. In this example, the virtual directory is "/news/." The filename part ranges from the last "/" after the domain name to "?." If without "?," then the filename part ranges from the last "/" after the domain name to "#." If without "?" and "#," then the filename part ranges from the last "/" after the domain name to the end. In this example, the filename is "index-.asp." The filename part is not an essential part of a URL; if this part is omitted, then a default filename is used. The anchor part ranges from "#" to the end. In this example, the anchor part is "name." The anchor part is not an essential part of a URL. The part from "?" to "#" is the parameter part, also referred to as search part or query part. In this example, the parameter part is "boardID=5&ID=24618&page=1." There may be multiple parameters, and "&" is used as a delimiter between parameters.

HTTP is a transport protocol used to transfer hypertext from a Web server to a local browser. HTTP transfers, based on a communication protocol like the Transmission Control 20) Protocol/Internet Protocol (TCP/IP), data such as Hyper Text Markup Language (HTML) files, picture files, query results, etc. HTTP, as an object-oriented protocol belonging to the application layer, is suitable for distributed hypermedia information systems due to its simplicity and fast approach. The HTTP protocol works on a client-server architecture. The browser, as an HTTP client, sends all requests, i.e., HTTP requests to an HTTP server, i.e., a Web server through URL. The Web server sends response information, i.e., HTTP responses to the client based on the received requests.

The HTTP request generally comprises the following four parts: the first part is a request line, used to specify the type of request, the resources to be accessed, and the HTTP version used; the second part is a request header, immediately following the request line (i.e., the first line) and used to specify the additional information used by the server; the third part is a blank line, which follows the request header and is necessary; the fourth part is the request data, also called the body, to which any other data may be added.

The HTTP response generally comprises the following four parts: a status line, a message header, a blank line, and the body of the response.

As described above, currently signature algorithms are implemented into corresponding edge servers in a traditional hard-coded manner. However, on the one hand, when a certain edge server needs to load a signature algorithm, if the signature algorithm is implanted in such a traditional hard-coded manner, then the efficiency of loading the signature algorithm is relatively low. On the other hand, in some scenarios, different clients might adopt different signature algorithms, i.e., clients might need customized signature algorithms. As there is a mass of edge servers in the CDN, if signature algorithms are implanted into edge servers corresponding to such clients that need customized signature algorithms in the traditional hard-coded manner, then low efficiency of loading signature algorithms in the whole CDN is brought, and ultimately, obvious bottlenecks in the efficiency of user access or service adaptation are caused.

To solve the above technical problems, this application provides a method and apparatus for dynamically loading a signature algorithm, a device and a storage medium, which implants, in a hot-pluggable manner, a script corresponding to a dynamic part of the signature algorithm on statically compiled software of an edge server, thereby improving the efficiency of loading the signature algorithm. Furthermore, from the perspective of the whole CDN delivery system, the efficiency of loading signature algorithms in the whole CDN may be improved, so that the efficiency of user access or service adaptation is increased.

The technical solution of this application will be illustrated in detail below.

Figure 2:
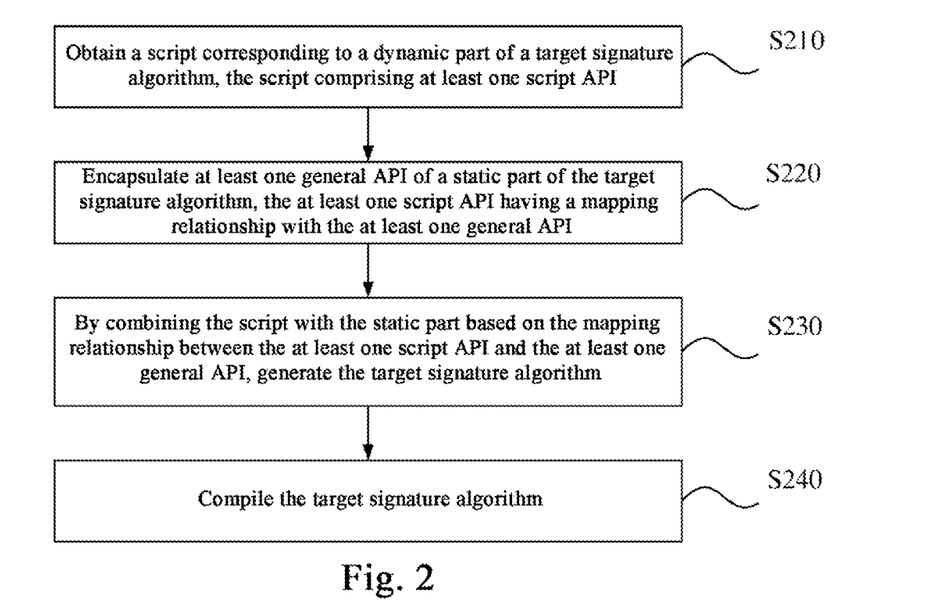
FIG. 2 is a flowchart of a method of dynamically loading a signature algorithm provided by an embodiment of the present application.

FIG. 2 is a flowchart of a method of dynamically loading a signature algorithm provided by an embodiment of this application, where the method is applied to an edge server to be loaded with a target signature algorithm, and optionally, the edge server may be built using a programming language such as the GO programming language but is not limited thereto. It is noteworthy that the loading here may be understood as the edge server loading a target signature algorithm for the first time or the edge server deleting an old version of the target signature algorithm and loading a new version of the target signature algorithm for the first time. As shown in FIG. 2, the method includes the following:

S210: a script corresponding to a dynamic part of the target signature algorithm is obtained, the script including at least one script application programming interface (API).

S220: at least one general API of a static part of the target signature algorithm is encapsulated, the at least one script API having a mapping relationship with the at least one general API.

S230: generating the target signature algorithm by combining the scrip with the static part based on the mapping relationship between the at least one script API and the at least one general API.

S240: the target signature algorithm is compiled.

Optionally, the application scenarios of the technical solution of this application may be as follows, but are not limited thereto:

Scenario 1: a certain user has adjusted service logic and expects to use another algorithm rule, i.e., the above target signature algorithm.

Scenario 2: a certain user is a new access user and has proposed his/her own service logic, e.g., using a private encryption algorithm, i.e., the above target signature algorithm.

It should be understood that the target signature algorithm may be any to-be-loaded signature algorithm. For example, the current signature algorithm may be a to-be-loaded HMAC algorithm or MD5 algorithm, etc., and this application is not intended to limit in this regard.

As an example, user A has adjusted service logic, uses the header["a"] and header["b"] of the client request and arg ["a"] in the question mark string, which are spliced together by "\t", and expects to use the target signature algorithm, i.e., the HMAC algorithm, for the signature, which may be ultimately saved into the request header["c"].

As an example, user B is a new access user. By using the header["c"] of the client request and the HTTP protocol, which are spliced together by "\n", and signing with the target signature algorithm, i.e., the MD5 algorithm, the signature may be ultimately saved into the question mark string ["xx"].

It should be understood that the target signature algorithm usually involve some general functions, such as query function, host query function, header addition function, header deletion function, header modifier function, header query function, HTTP protocol query function, cryptographic computation function, service parameter query function, etc., which form the static part of the target signature algorithm, i.e., the unchanged part of the target signature algorithm.

On the contrary, each signature algorithm may differ slightly, or, even the same target signature algorithm may be slightly different for different users, i.e., the target signature algorithm may be a customized signature algorithm. This part of content is a dynamic part of the target signature algorithm, which may be some dynamic parameters, dynamic logic and the like in the target signature algorithm. The dynamic part is also referred to as variable part of the target signature algorithm.

Optionally, the edge server may encapsulate at least one script API of the script in accordance with the division of various functional modules of the script. For example, functional modules corresponding to the script API1 comprise: parameters for converting string to uppercase, and the functional modules corresponding to the script API2 comprise: parameters for converting string to lowercase.

Optionally, the script may be a Luna script, and based thereon, the script API in this application is also referred to as Luna API.

Optionally, the edge server may encapsulate at least one general API of a static part of the target signature algorithm based on the division situation of various functional modules of the static part of the target signature algorithm. For example, the functional module corresponding to the general API1 is used to perform the operation of converting the string to uppercases, and the functional module corresponding to the general API2 is used to perform the operation of converting string to lowercases.

Optionally, as described above, the edge server may be built using GO, and based thereon, the general API in this application may also be referred to as GO API.

Figure 3:
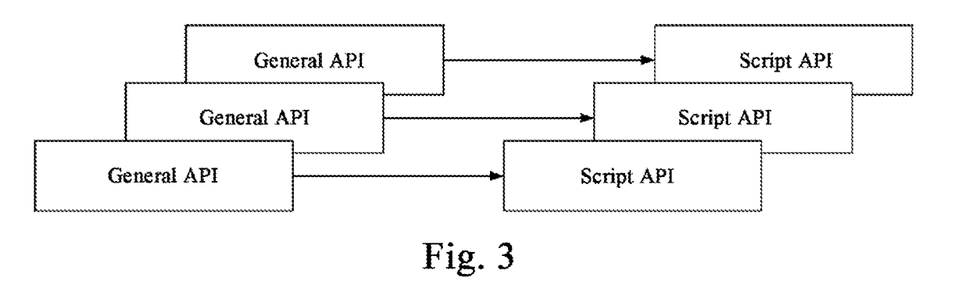
FIG. 3 is a schematic view of a mapping relationship between at least one script API and at least one general API provided by an embodiment of the present application.

Optionally, a mapping relationship between the at least one script API and the at least one general API may be built on the edge server or an intelligent device. For example, the mapping relationship between the at least one script API and the at least one general API may be built on other server and then sent to the edge server. This application is not intended to limit in this regard. As an example, FIG. 3 is a schematic view of a mapping relationship between at least one script API and at least one general API provided by an embodiment of the present application. As depicted, the mapping relationship between the at least one script API and the at least one general API here may be one-to-one correspondence. For example, the functional module corresponding to the script API1 comprises: parameters for converting string to uppercase, and the functional module corresponding to the script API2 comprises: parameters for converting string to lowercase. The functional module corresponding to the general API1 is used to perform the operation of converting string to uppercases, and the functional module corresponding to the script API2 is used to perform the operation of converting string to lowercases. Therefore, the script API1 corresponds to the general API1, and the script API2 corresponds to the general API2.

It should be understood that the mapping relationship between the at least one script API and the at least one general API is not limited to one-to-one correspondence, e.g., multiple-to-one mapping relationship, one-to-multiple mapping relationship, or multiple-to-multiple mapping relationship. The present application is not intended to limit in this regard.

Further, after obtaining the mapping relationship between the at least one script API and the at least one general API, the edge server may combine the script with the static part based on the mapping relationship, to obtain a target signature algorithm. For example, based on the mapping relationship, the edge server transfers a dynamic parameter in the script through the script API to the general API corresponding to the script API, and then transfers the dynamic parameter through the general API to a corresponding general function. For another example, based on the mapping relationship, the edge server transfers dynamic logic in the script through the script API to the general API corresponding to the script API, and then transfers the dynamic logic through the general API to a corresponding general function. For a further example, based on the mapping relationship, the edge server transfers a dynamic parameter and dynamic logic in the script through the script API to the general API corresponding to the script API, and then transfers the dynamic parameter and dynamic logic through the general API to a corresponding general function. Or, for example, based on the mapping relationship, the edge server transfers a general function of the static part through a corresponding general API to a script API, and then transfers the general function through the script API to the script, at which point the script has the general function and the dynamic parameter, or the general function and the dynamic logic, or the general function, the dynamic parameter and the dynamic logic.

As an example, suppose the functional module corresponding to the script API1 comprises a parameter for converting string to uppercase, and the functional module corresponding to the script API2 comprises a parameter for converting string to lowercase. The functional module corresponding to the general API1 is used to perform the operation of converting string to uppercase, and the functional module corresponding to the script API2 is used to perform the operation of converting string to lowercase. The script API1 corresponds to the general API1, and the script API2 corresponds to the general API2. Based on the corresponding relation between the script API1 and the general API1, the edge server may transfer the parameter for converting string to lowercase through the script API1 to the general API1, thereby achieving the function of converting string to lowercase in the target signature algorithm. Similarly, based on the corresponding relation between the script API2 and the general API2, the edge server may transfer the parameter for converting string to uppercase through the script API2 to the general API2, thereby achieving the string to uppercase function in the target signature algorithm.

Further, after generating the target signature algorithm, the edge server needs to convert the target signature algorithm into recognizable content, i.e., needs to compile the target signature algorithm.

To sum up, in the present application, the edge server may obtain a script corresponding to the dynamic part of the target signature algorithm, the script comprising at least one script API, encapsulates at least one general API of the dynamic part of the target signature algorithm, the at least one script API having a mapping relationship with the at least one general API, by combining the script with the static part based on the mapping relationship between the at least one script API and the at least one general API, generate the target signature algorithm, and compiles the target signature algorithm. That is, the script corresponding to the dynamic part of the signature algorithm may be implanted in a hot-pluggable manner on statically compiled software of the edge server, thereby increasing the efficiency of loading the signature algorithm. Moreover, from the perspective of the whole CDN delivery system, the efficiency of loading signature algorithm in the whole CDN may be increased, and the efficiency of user access or service adaptation is improved.

Further, the method of dynamically loading provided by the present application may be performed before the edge server obtains the HTTP request. That is, the loading process of the target signature algorithm is a preloading process, the encapsulating the at least one general API of the static part of the target signature algorithm as involved in the loading process may be referred to as preloading process, and the compiling the target signature algorithm is also a pre-compiling process. Therefore, the loading efficiency of the signature algorithm may be further increased.

Optionally, the edge server may store the identity of the target signature algorithm and the compilation result into a hash table.

It should be understood that the identifier of the target signature algorithm and the corresponding compilation result may also not be stored as table entries in a hash table, and this application is not intended to limit the storage mode of the compilation result and identifier of any signature algorithm.

Optionally, the identifier of the target signature algorithm is the name of the target signature algorithm or the name of the script corresponding to the dynamic part of the target signature algorithm. Since the uniqueness or customization of each signature algorithm is mainly reflected in the script corresponding to the dynamic part, the signature algorithm may be uniquely identified by the name of the script.

Figure 4:
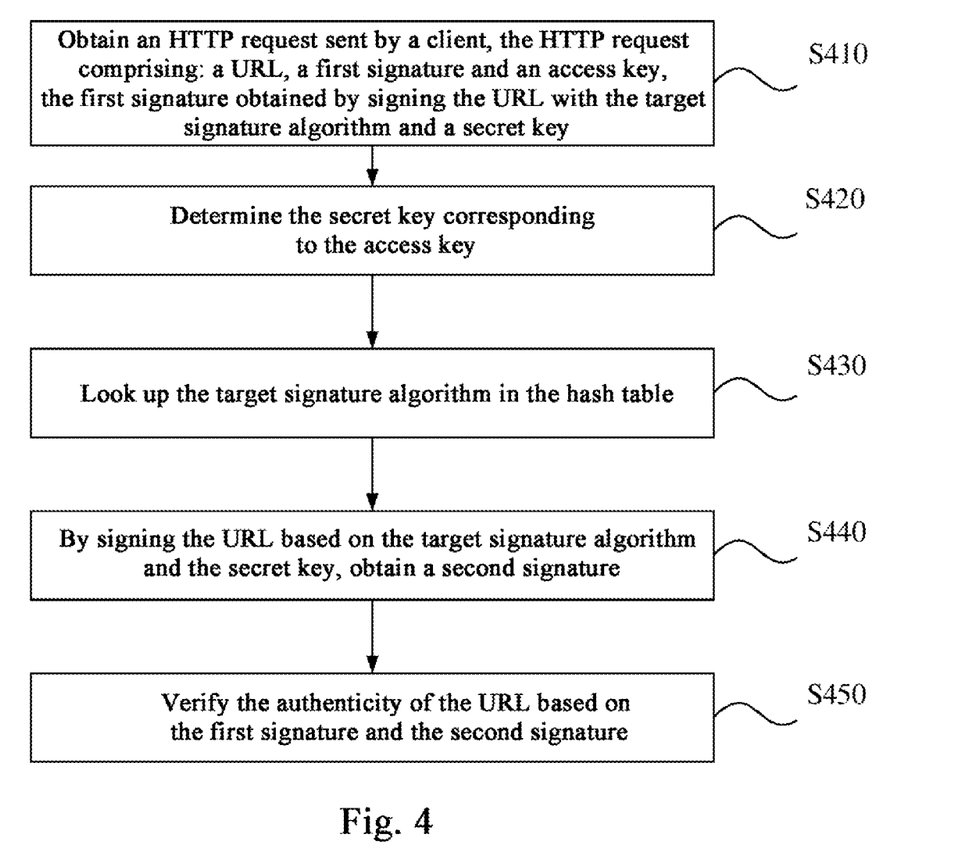
FIG. 4 is a flowchart of a method of using a signature algorithm provided by an embodiment of the present application.

FIG. 4 is a flowchart of a method of using a signature algorithm provided by an embodiment of the present application, where the method is applied to an edge server which has been loaded with a target signature algorithm. Optionally, the edge server may be built using GO but is not limited thereto. As shown in FIG. 4, the method comprises the following:

S410: an HTTP request sent by a client is obtained, the HTTP request comprising: a URL, a first signature and an AK, the first signature obtained by signing the URL with a target signature algorithm and an SK.

S420: The SK corresponding to the AK is determined.

S430: the target signature algorithm is looked up in a hash table.

S440: by signing the URL based on the target signature algorithm and the SK in order, a second signature is obtained.

S450: the authenticity of the URL is verified based on the first signature and the second signature.

It is noteworthy that the present application is not intended to limit how the URL is signed based on the target signature algorithm and the SK.

It should be understood that the SK and the AK have a corresponding relation, which are a pair of public and secret keys, i.e., the SK may be determined through the AK.

It should be understood that the first signature is a signature which is obtained by the client signing the URL based on the target signature algorithm and the SK. The second signature is a signature which is obtained by the edge server signing the URL based on the target signature algorithm and the SK. In response to the first signature being the same as the second signature, it means the URL is authentic; in response to the first signature being different from the second signature, it means the URL is not authentic.

Optionally, the client may decide a required signature algorithm, i.e., the signature algorithm corresponding to the client, and then may notify the edge server of the corresponding signature algorithm. Or the edge server may determine, based on the domain name configuration of the client, that the signature algorithm corresponding to the client is the target signature algorithm. In a word, the present application is not intended to limit how the edge server determines the signature algorithm corresponding to the client.

Optionally, the domain name configuration of the client comprises: a signature algorithm required by the client, i.e., the signature algorithm corresponding to the client.

Optionally, the domain name configuration of the client further comprises at least one of: a secret key parameter, service logic, expiration time of the corresponding signature algorithm of the client, etc., where the secret key parameter comprises an AK and an SK, but is not limited thereto.

Optionally, for a CDN delivery system with one-layer architecture, i.e., the CDN delivery system only comprises an edge server but does not comprise any regional server or central server, in response to the URL being verified to be authentic, then the edge server determines whether access data corresponding to the URL is locally cached, such as HTML files, picture files, query results, etc. In response to the access data corresponding to the URL being locally cached, the edge server sends the access data to the client, which may be carried in an HTTP response. In response to the corresponding data for the URL being not locally cached, then the edge server sources back based on the second signature, i.e., sends the second signature to the source station.

Optionally, for a CDN delivery system with two-layer architecture, i.e., the CDN delivery system comprises both an edge server and a regional server, in response to the URL being verified to be authentic, the edge server determines whether access data corresponding to the URL is locally cached, such as HTML files, picture files, query results, etc. In response to the access data corresponding to the URL being locally cached, the edge server sends the access data to the client, which may be carried in an HTTP response. In response to the access data corresponding to the URL being not locally cached, at this point the edge server first sends the second signature to its corresponding regional server, and then the regional server checks whether the corresponding access data for the URL is locally stored. In response to the access data corresponding to the URL being locally cached, the regional server sends the access data to the client. In response to the access data corresponding to the URL being not locally cached, at this point the regional server sources back based on the second signature, i.e., sends the second signature to the source station.

Optionally, for a CDN delivery system with three-layers architecture, i.e., the CDN delivery system comprises an edge server, a regional server and a central server, in response to the URL being verified to be authentic, the edge server determines whether access data corresponding to the URL is locally cached, such as HTML files, picture files, query results, etc. In response to the access data corresponding to the URL being locally cached, the edge server sends the access data to the client, which may be carried in an HTTP response. In response to the access data corresponding to the URL being not locally cached, at this point the edge server first sends the second signature to its corresponding regional server, and then the regional server checks whether the access data corresponding to the URL is locally stored. In response to the access data corresponding to the URL being locally cached, the regional server sends the access data to the client. In response to the access data corresponding to the URL being not locally cached, first the regional server sends the second signature to the central server, and then the central server checks whether the access data corresponding to the URL is locally store. In response to the access data corresponding to the URL being locally cached, the central server sends the access data to the client. In response to the access data corresponding to the URL being not locally cached, at this point the central server sources back based on the second signature, i.e., sends the second signature to the source station.

It is noteworthy that the present application is not intended to limit the architecture of the CDN delivery system, and accordingly, nor intended to limit how to send access data to the client.

Optionally, the method of dynamically loading a signature algorithm may be specifically performed by at least one processor or at least one chip in the edge server. For example, the method may be performed by a KISS and Fast Cache (KFC) in the edge server, KISS representing "keep it simple and stupid."

Figure 5:
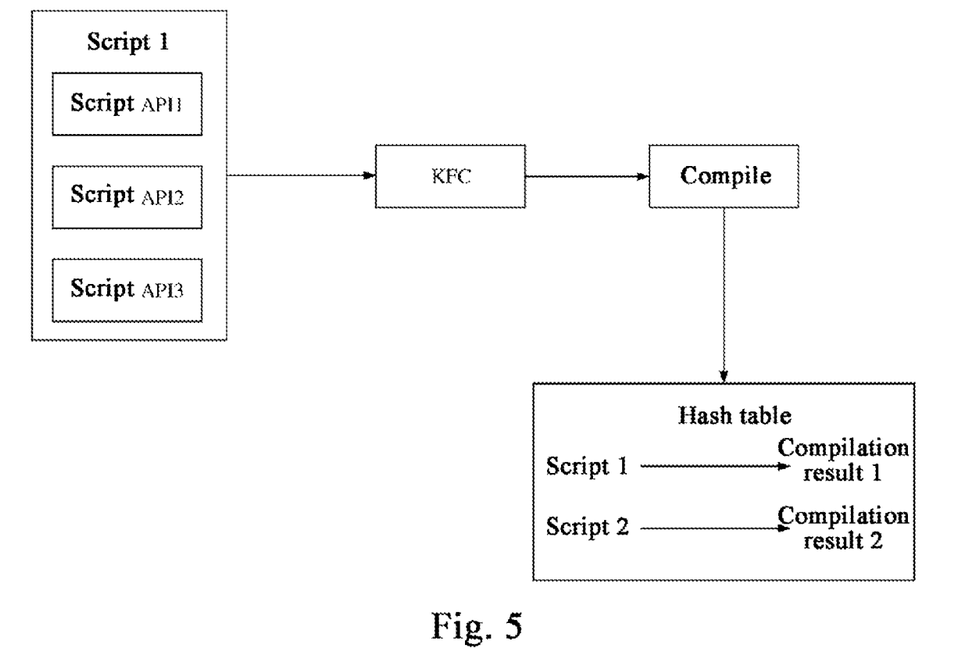
FIG. 5 is a schematic view of a script preloading process provided by an embodiment of the present application.

As described above, the target SK algorithm may be preloaded to the edge server, while the script of the dynamic part in the target SK algorithm is part of the target SK algorithm, it may be understood that the script is also preloaded to the edge server. As an example, FIG. 5 is a schematic view of the script preloading process provided by an embodiment of the present application. As depicted, a script 1 comprises: a script API1, a script API2 and a script API3. Through these APIs the script 1 may be preloaded to the KFC, and further, the KFC may compile the target SK algorithm and finally store a compilation result into a hash table. As shown in FIG. 5, the hash table stores an identifier of the script 1 and a corresponding compilation result 1. In the present application, the compilation result may be binary values. Optionally, the hash table may further store an identifier of other SK algorithm and a corresponding compilation result. For example, as shown in FIG. 5, the hash table further stores an identifier of a script 2 and a corresponding compilation result 2.

Figure 6:
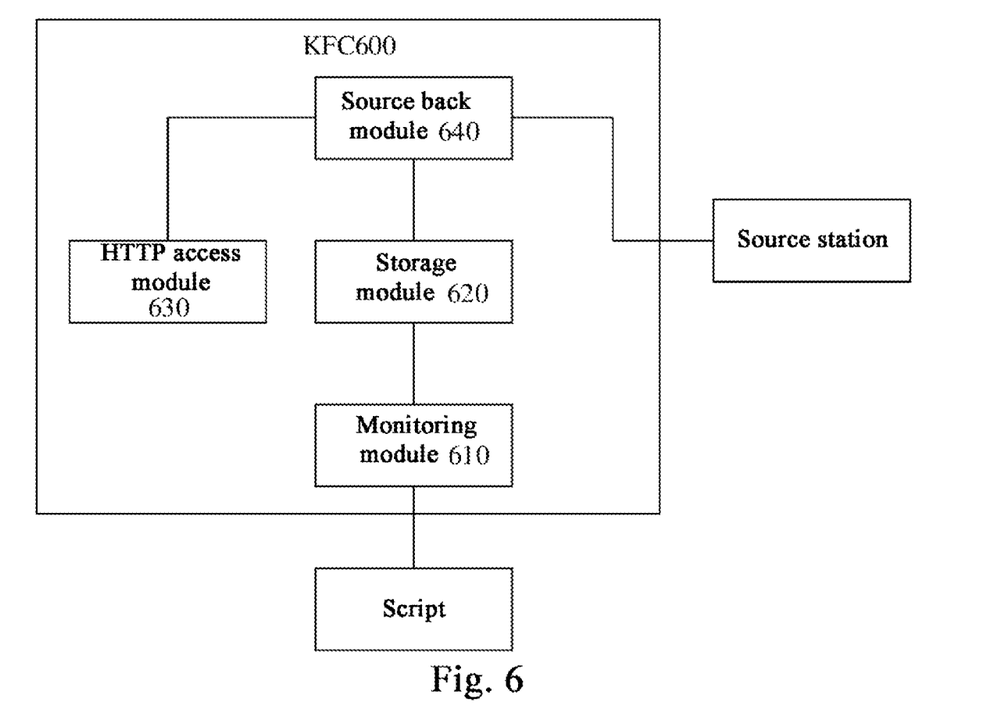
FIG. 6 is a schematic view of an KFC 600 provided by an embodiment of the present application.

Optionally, the KFC may comprise the following functional modules, but is not limited to: an HTTP access module, a source back module, a monitoring module and a storage module. As an example, FIG. 6 is a schematic view of an KFC 600 provided by an embodiment of the present application. As depicted, a monitoring module 610 in the KFC 600 is responsible for monitoring whether a script under a script file directory has changed. For example, the monitoring module 610 monitors whether a new signature algorithm is added under the directory or whether a signature algorithm has been updated. In response to a new signature algorithm being added under the directory or a signature algorithm has been updated, the monitoring module 610, based on a dynamically loading method of a monitoring algorithm, loads the signature algorithm and stores a compilation result of the signature algorithm into a storage module 620.

Optionally, an identifier of the signature algorithm and a compilation result corresponding to the signature algorithm may be stored in a hash table, and the hash table is stored in the storage module 620.

It should be understood that the corresponding compilation result of the signature algorithm may also not be stored in the form of hash table entries, and the present application is not intended to limit the storage manner of the compilation result of the signature algorithm.

Optionally, the identifier of the signature algorithm is a name of the signature algorithm or a name of the script of the signature algorithm. Since the uniqueness or customization of each signature algorithm is mainly reflected in the script corresponding to the dynamic part, the signature algorithm may be uniquely identified by the name of the script.

Optionally, an HTTP access module 630 in the KFC may obtain an HTTP request, the HTTP request comprising: an URL, a first signature and an AK, the first signature obtained by signing the URL with a target signature algorithm and an SK; and sent the HTTP request to a source back module 640, which is used to determine the SK corresponding to the AK. The target signature algorithm is looked up in the hash table. The URL is signed based on the target signature algorithm and the SK in order to obtain a second signature. The authenticity of the URL is verified based on the first signature and the second signature. If the first signature and the second signature are same, it means the URL is authentic; if the first signature and the second signature are different, it means the URL is not authentic. Further, the source back module 640 may check whether the storage module 620 locally caches access data corresponding to the URL. If the storage module 620 locally caches access data corresponding to the URL, the source back module 640 sends the access data to the client; if the storage module 620 does not locally each access data corresponding to the UR, then the source back module 640 sources back based on the second signature, i.e., sends the second signature to the source station. It is noteworthy that the CDN delivery system is supposed here to have one-layer architecture. Of course, the CDN delivery system may also adopt multi-layers architecture, in which case the source back module 640 returns the access data or the second signature to an upper-layer server till the client obtains the access data.

With the technical solution provided by the present application, the signature algorithm completes the upgrade by pushing to the whole network with one click from originally rolling upgrade by thousands of machines, with the upgrade efficiency increasing by more than 100 times. Moreover, with the technical solution provided by the present application, the burden of CPU consumption is reduced with virtually no impact on the access quality.

Now that the method embodiment of the present application has been described in detail in conjunction with FIG. 1 to FIG. 6, a detailed description is presented to an apparatus embodiment of the present application with reference to FIG. 7 below. It should be understood that the apparatus embodiment corresponds to the method embodiment, and for similar description, reference may be made to the method embodiment.

An embodiment of the present application further provides an apparatus of dynamically loading a signature algorithm. The apparatus of dynamically loading comprises: a first obtaining module, an encapsulating module, a generating module and a compiling module, where the first obtaining module is configured to obtain a script corresponding to a dynamic part of a target signature algorithm, the script comprising at least one script API. The encapsulating module is configured to encapsulate at least one general API of a static part of the target signature algorithm, the at least one script API having a mapping relationship with the at least one general API. The generating module is configured to, by combining the script with the static part based on the mapping relationship between the at least one script API and the at least one general API, generate the target signature algorithm. The compiling module is configured to compile the target signature algorithm.

Optionally, the apparatus of dynamically loading further comprises: a storage module, configured to, after the compiling module compiles the target signature algorithm, store an identifier of the target signature algorithm and a compilation result of the target signature algorithm to a hash table.

Optionally, the apparatus of dynamically loading further comprises: a second obtaining module, a first determining module, a lookup module, a signature module, and a verifying module, where the second obtaining module is configured to obtain an HTTP request sent by a client, the HTTP request comprising: a URL, a first signature and an access key, the first signature obtained by signing the URL with the target signature algorithm and a secret key. The first determining module is configured to determine the secret key corresponding to the access key. The lookup module is configured to look up the target signature algorithm in the hash table. The signing module is configured to, by signing the URL based on the target signature algorithm and the secret key, obtain a second signature. The verifying module is configured to verify the authenticity of the URL based on the first signature and the second signature.

Optionally, the apparatus of dynamic loading further comprises: a third obtaining module and a second determining module, where the third obtaining module is configured to obtain domain name configuration of the client before the lookup module looks up the target signature algorithm in the hash table. The second determining module is configured to determine, based on the domain name configuration of the client, that a signature algorithm corresponding to the client is the target signature algorithm.

Optionally, the apparatus of dynamically loading further comprises: a determining module, a sending module and a source back module, where the determining module is configured to, if the URL is verified to be authentic, determine whether access data corresponding to the URL is locally cached. The sending module is configured to, in response to the access data corresponding to the URL being locally cached, send the access data to the client. The source back module is configured to, in response to the access data corresponding to the URL being not locally cached, source back based on the second signature.

Optionally, the verifying module is configured to determine the URL is authentic in response to the first signature being the same as the second signature, and determine the URL is not authentic in response to the first signature being different from the second signature.

Optionally, the identifier of the target signature algorithm is a name of the target signature algorithm or a name of the script.

Optionally, the apparatus of dynamically loading a signature algorithm is built using GO.

It should be understood that the apparatus embodiment may correspond to the method embodiment. Similar description may refer to the method embodiment, which is not detailed here in order to avoid repetition. Specifically, the apparatus of dynamically loading a signature algorithm may perform the method embodiment, and the foregoing and other operations and/or functions of the respective modules in the apparatus of dynamically loading a signature algorithm are corresponding flows in the respective methods in the method embodiment, which is not detailed here for the purpose of simplicity.

The apparatus of dynamically loading according to the embodiment of the present application has been described from the perspective of functional modules in conjunction with the figures. It should be understood that the functional module may be implemented in hardware form, through instructions in software form, or through a combination of hardware and software modules. Specifically, the respective steps of the method embodiment of the present application may be accomplished by integrated logic circuits of hardware in a processor and/or instructions in software form, and the steps of the method disclosed in conjunction with the embodiments of the present application may be directly embodied as being performed by a hardware decoding processor or performed by a combination of hardware and software modules in the decoding processor. Optionally, the software module may be located in a random memory, flash memory, read-only memory, programmable read-only memory, electrically erasable programmable memory, register and other mature storage medium in the art. The storage medium is located in a memory, and a processor reads information in the memory to perform the steps of the method embodiment in conjunction with hardware.

Figure 7:
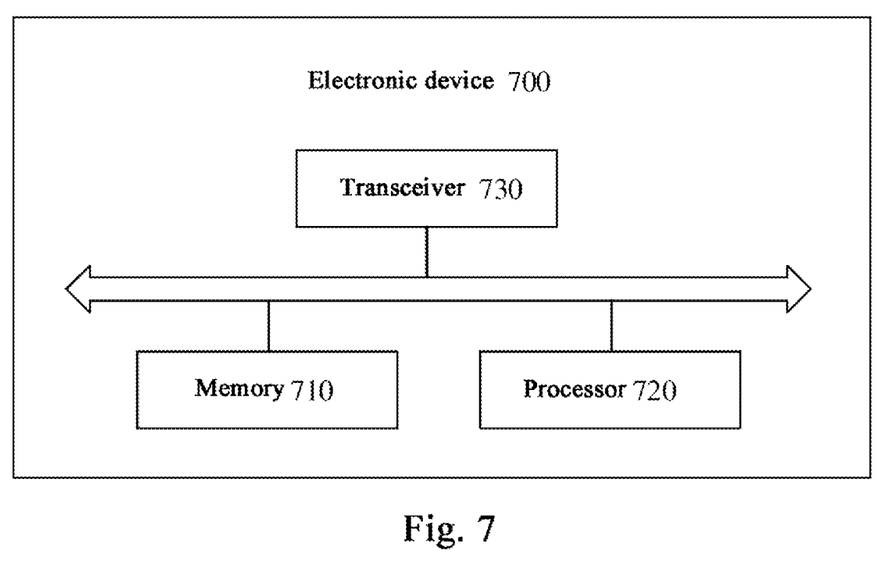
FIG. 7 is a schematic block diagram of an electronic device 700 provided by an embodiment of the present application.

FIG. 7 is a schematic block diagram of an electronic device 700 provided by an embodiment of the present disclosure. The electronic device 700 may be used as an edge server.

As shown in FIG. 7, the electronic device 700 may comprise: a memory 710 and a processor 720, where the memory 710 is configured to store a computer program and transmit the computer program code to the processor 720. In other words, the processor 720 may call and run the computer program from the memory 710 so as to perform the method in the embodiments of the present application.

For example, the processor 720 may be configured to perform the method embodiment according to instructions in the computer program.

In some embodiments of the present application, the processor 720 may include but is not limited to: a general processor, a digital signal processor (DSP), application specific integrated circuit (ASIC), a field-programmable gate array (FPGA) or other programmable logic device, a discrete gate or a transistor logic device, a discrete hardware component, etc.

In some embodiments of the present application, the memory 710 includes but is not limited to: a volatile memory and/or non-volatile memory, wherein the non-volatile memory may be a read-only memory (ROM), programmable ROM (PROM), erasable PROM (EPROM), electrically EPROM (EEPRPM) or flash, and the non-volatile memory may be a random-access memory (RAM) which is used as an external cache. As exemplary rather than limiting illustration, many types of RAM may be used, such as static RAM (SRAM), dynamic RAM (DRAM), synchronous DRAM (SDRAM), double data rate SDRAM (DDR SDRAM), enhanced SDRAM (ESDRAM), synch link DRAM (SLDRAM) and direct rambus RAM (DR RAM).

In some embodiments of the present application, the computer program may be partitioned into one or more modules, stored in the memory and executed by the processor 720 to perform the method provided in the present application. The one or more modules may be a series of computer program instruction segments capable of accomplishing specific functions, the instruction segments being used to describe the execution process of the computer program in the electronic device.

As shown in FIG. 7, the electronic device may further comprise: a transceiver 730, which is connectable to the processor 720 or the memory 710.

The processor 720 may control the transceiver 730 to communicate with other device, and specifically, may send information or data to other device or receive information or data sent by other device. The transceiver 730 may comprise a transmitter and a receiver. The transceiver 730 may further comprise an antenna, and the number of antenna(s) may be one or more.

It should be understood that various components in the electronic device are connected by a bus system, wherein the bus system, besides a data bus, further comprises a power bus, a control bus and a status signal bus.

The present application further provides a computer storage medium, in which a computer program is stored, the computer program, when executed by a computer, causing the computer to perform the method as described in the above method embodiment. In other words, an embodiment of the present application further provides a computer program product containing instructions which, when executed by a computer, cause the computer to perform the method as described in the above method embodiment.

When implemented using software, an implementation as a computer program product in whole or in part may take. The computer program product comprises one or more computer instructions. When the computer program instruction is loaded and executed on a computer, all or part of the flow or functions according to the embodiments of the present application may be generated. The computer may be a general-purpose computer, a dedicated computer, a computer network or other programmable device. The computer instruction may be stored in a computer readable storage medium or transmitted from one computer readable storage medium to another. For example, the computer instruction may be transmitted from one website, computer, server or data center to another website, computer, server or data center in a wired (e.g., coaxial cable, optical fiber, digital subscriber line (DSL)) or wireless (e.g., infrared, wireless, microwave, etc.) way. The computer readable storage medium may be any available medium accessible by the computer or a server, data center and other data storage device integrated with one or more available media. The available media may be magnetic media (e.g., floppy disk, hard disk, tape), optical media (e.g., digital video disc (DVD)), or semiconductor media (e.g., solid state disk (SSD)), and the like.

According to one or more embodiments of the present disclosure, a method of dynamically loading a signature algorithm is provided. The method comprises: obtaining a script corresponding to a dynamic part of a target signature algorithm, the script comprising at least one script API; encapsulating at least one general API of a static part of the target signature algorithm, the at least one script API having a mapping relationship with the at least one general API; by combining the script with the static part based on the mapping relationship between the at least one script API and the at least one general API, generating the target signature algorithm; compiling the target signature algorithm.

According to one or more embodiments of the present disclosure, after compiling the target signature algorithm, further comprised is: storing an identifier of the target signature algorithm and a compilation result of the target signature algorithm to a hash table.

According to one or more embodiments of the present disclosure, after storing an identifier of the target signature algorithm and a compilation result of the target signature algorithm to a hash table, further comprised is: obtaining an HTTP request sent by a client, the HTTP request comprising: a URL, a first signature and an access key, the first signature obtained by signing the URL with the target signature algorithm and a secret key; determining the secret key corresponding to the access key; looking up the target signature algorithm in the hash table; by signing the URL based on the target signature algorithm and the secret key, obtaining a second signature; verifying the authenticity of the URL based on the first signature and the second signature.

According to one or more embodiments of the present disclosure, before looking up the target signature algorithm in the hash table, further comprised is: obtaining domain name configuration of the client; determining, based on the domain name configuration of the client, that a signature algorithm corresponding to the client is the target signature algorithm.

According to one or more embodiments of the present disclosure, after verifying the authenticity of the URL based on the first signature and the second signature, further comprised is: in response to the URL being verified to be authentic, determining whether access data corresponding to the URL is locally cached; in response to the access data corresponding to the URL being locally cached, sending the access data to the client; in response to the access data corresponding to the URL being not locally cached, sourcing back based on the second signature.

According to one or more embodiments of the present disclosure, the verifying the authenticity of the URL based on the first signature and the second signature comprises: determining that the URL is authentic in response to the first signature being the same as the second signature, determining that the URL is not authentic in response to the first signature being different from the second signature.

According to one or more embodiments of the present disclosure, the identifier of the target signature algorithm is a name of the target signature algorithm or a name of the script.

According to one or more embodiments of the present disclosure, the apparatus of dynamically loading a signature algorithm is built using GO.

According to one or more embodiments of the present disclosure, an apparatus of dynamically loading a signature algorithm is provided. The apparatus of dynamically loading comprises: a first obtaining module, an encapsulating module, a generating module and a compiling module, where the first obtaining module is configured to obtain a script corresponding to a dynamic part of a target signature algorithm, the script comprising at least one script API. The encapsulating module is configured to encapsulate at least one general API of a static part of the target signature algorithm, the at least one script API having a mapping relationship with the at least one general API. The generating module is configured to, by combining the script with the static part based on the mapping relationship between the at least one script API and the at least one general API, generate the target signature algorithm. The compiling module is configured to compile the target signature algorithm.

According to one or more embodiments of the present disclosure, the apparatus of dynamically loading further comprises: a storage module, configured to, after the compiling module compiles the target signature algorithm, store an identifier of the target signature algorithm and a compilation result of the target signature algorithm into a hash table.

According to one or more embodiments of the present disclosure, the apparatus of dynamically loading further comprises: a second obtaining module, a first determining module, a lookup module, a signature module, and a verifying module, where the second obtaining module is used to obtain an HTTP request sent by a client, the HTTP request comprising: a URL, a first signature and an access key, the first signature obtained by signing the URL with the target signature algorithm and a secret key. The first determining module is used to determine the secret key corresponding to the access key. The lookup module is used to look up the target signature algorithm in the hash table. The signing module is used to, by signing the URL based on the target signature algorithm and the secret key, obtain a second signature. The verifying module is used to verify the authenticity of the URL based on the first signature and the second signature.

According to one or more embodiments of the present disclosure, the apparatus of dynamically loading further comprises: a third obtaining module and a second determining module, where the third obtaining module is used to obtain domain name configuration of the client before the lookup module looks up the target signature algorithm in the hash table. The second determining module is used to determine, based on the domain name configuration of the client, that a signature algorithm corresponding to the client is the target signature algorithm.

According to one or more embodiments of the present disclosure, the apparatus of dynamically loading further comprises: a determining module, a sending module and a source back module, where the determining module is used to, in response to the URL being verified to be authentic, determine whether access data corresponding to the URL is locally cached. The sending module is used to, in response to the access data corresponding to the URL being locally cached, send the access data to the client. The source back module is used to, in response to the access data corresponding to the URL being not locally cached, source back based on the second signature.

According to one or more embodiments of the present disclosure, the verifying module is used to determine the URL is authentic in response too the first signature being the same as the second signature, and determine the URL is not authentic in response to the first signature being different from the second signature.

According to one or more embodiments of the present disclosure, the identifier of the target signature algorithm is a name of the target signature algorithm or a name of the script.

According to one or more embodiments of the present disclosure, the apparatus of dynamically loading a signature algorithm is built using GO.

According to one or more embodiments of the present disclosure, an electronic device is provided, comprising: a processor and a memory, the memory used to store a computer program, and the processor used to call and run the computer program stored in the memory so as to perform the above described method of dynamically loading a signature algorithm.

According to one or more embodiments of the present disclosure, a computer readable storage medium is provided for storing a computer program, which causes a computer to perform the above described method of dynamically loading a signature algorithm.

Those of ordinary skill in the art may realize that various example modules and algorithm steps described in conjunction with the embodiments disclosed herein can be implemented as electronic hardware or a combination of computer software and electronic hardware. Whether these functions are performed in hardware or software depends on the specific application and design constraints of the technical solution. Those skilled in the art may perform the described functions by use different methods for each particular application, whereas such performance should not be considered as exceeding the scope of the present application.

It should be understood from the several embodiments provided in the present application that the disclosed system, apparatus and method may be implemented in other way. For example, the apparatus embodiment described above is merely illustrative. For example, the division of modules is merely a logical functional division, and the actual implementation may have further division, for example, multiple modules or components may be combined or integrated into another system, or some of features may be omitted or not performed. In addition, the mutual coupling or direct coupling or communicative connection as shown or discussed may be an indirect coupling or communicative connection through some interface, device or module, which may be electrical, mechanical or otherwise.

The modules illustrated as separated components may or may not be physically separated, and the components shown as modules may or may not be physical modules, i.e., they may be located in a single place or may also be distributed over multiple network units. Part or all of the modules may be selected to accomplish the objective of the solution of the embodiments according to actual needs. For example, various functional modules in the respective embodiments of the present application may be integrated in a single processing module, or each module may physically exist separately, or two or more modules may be integrated in a single module.

While specific embodiments of the present application have been described above, the protection scope of the present application is not limited thereto. All changes or replacements that are readily perceived by those skilled in the art within the technical scope disclosed in the present application shall be covered by the protection scope of the present application. Therefore, the protection scope of the present application shall be subject to the protection scope of the claims.

I claim:

1. A method of dynamically loading a signature algorithm, comprising:
    obtaining a script corresponding to a dynamic part of a target signature algorithm, the script comprising at least one script application programming interface (API);
    encapsulating at least one general API of a static part of the target signature algorithm, the at least one script API having a mapping relationship with the at least one general API;
    by combining the script with the static part based on the mapping relationship between the at least one script API and the at least one general API, generating the target signature algorithm;
    compiling the target signature algorithm;
    storing an identifier of the target signature algorithm and a compilation result of the target signature algorithm into a hash table;
    obtaining a hyper text transfer protocol (HTTP) request sent by a client, the HTTP request comprising: a uniform resource locator (URL), a first signature, and an access key, and the first signature being obtained by signing the URL with the target signature algorithm and a secret key;

determining the secret key corresponding to the access key;
looking up the target signature algorithm in the hash table;
by signing the URL based on the target signature algorithm and the secret key, obtaining a second signature; and
verifying authenticity of the URL based on the first signature and the second signature.

2. The method according to claim 1, the method further comprising: before the looking up the target signature algorithm in the hash table,
obtaining domain name configuration of the client; and
determining, based on the domain name configuration of the client, that a signature algorithm corresponding to the client is the target signature algorithm.

3. The method according to claim 2, the method further comprising: after the verifying the authenticity of the URL based on the first signature and the second signature,
in response to verifying the URL to be authentic, determining whether access data corresponding to the URL is locally cached;
in response to the access data corresponding to the URL being locally cached, sending the access data to the client; and
in response to the access data corresponding to the URL being not locally cached, sourcing back based on the second signature.

4. The method according to claim 2, wherein the verifying the authenticity of the URL based on the first signature and the second signature comprises:
in response to the first signature being the same as the second signature, determining that the URL is authentic; and
in response to the first signature being different from the second signature, determining that the URL is not authentic.

5. The method according to claim 2, wherein the identifier of the target signature algorithm is a name of the target signature algorithm or a name of the script.

6. The method according to claim 1, the method further comprising: after the verifying the authenticity of the URL based on the first signature and the second signature,
in response to verifying the URL to be authentic, determining whether access data corresponding to the URL is locally cached;
in response to the access data corresponding to the URL being locally cached, sending the access data to the client; and
in response to the access data corresponding to the URL being not locally cached, sourcing back based on the second signature.

7. The method according to claim 1, wherein the verifying the authenticity of the URL based on the first signature and the second signature comprises:
in response to the first signature being the same as the second signature, determining that the URL is authentic; and
in response to the first signature being different from the second signature, determining that the URL is not authentic.

8. The method according to claim 1, wherein the identifier of the target signature algorithm is a name of the target signature algorithm or a name of the script.

9. The method according to claim 1, wherein the method is applied in an edge server.

10. An electronic device, comprising:
a processor and a memory, the memory storing a computer program, and the processor configured to call and run the computer program stored in the memory—and configured to:
obtain a script corresponding to a dynamic part of a target signature algorithm, the script comprising at least one script application programming interface (API);
encapsulate at least one general API of a static part of the target signature algorithm, the at least one script API having a mapping relationship with the at least one general API;
by combining the script with the static part based on the mapping relationship between the at least one script API and the at least one general API, generate the target signature algorithm;
compile the target signature algorithm;
store an identifier of the target signature algorithm and a compilation result of the target signature algorithm into a hash table;
obtain a hyper text transfer protocol (HTTP) request sent by a client, the HTTP request comprising: a uniform resource locator (URL), a first signature, and an access key, and the first signature being obtained by signing the URL with the target signature algorithm and a secret key;
determine the secret key corresponding to the access key;
look up the target signature algorithm in the hash table;
by signing the URL based on the target signature algorithm and the secret key, obtain a second signature; and
verify authenticity of the URL based on the first signature and the second signature.

11. The electronic device according to claim 10, wherein the processor is further configured to: before the looking up the target signature algorithm in the hash table,
obtain domain name configuration of the client; and
determine, based on the domain name configuration of the client, that a signature algorithm corresponding to the client is the target signature algorithm.

12. The electronic device according to claim 10, wherein the processor is further configured to: after the verifying the authenticity of the URL based on the first signature and the second signature,
in response to verifying the URL to be authentic, determine whether access data corresponding to the URL is locally cached;
in response to the access data corresponding to the URL being locally cached, send the access data to the client; and
in response to the access data corresponding to the URL being not locally cached, source back based on the second signature.

13. The electronic device according to claim 10, wherein the processor is further configured to
in response to the first signature being the same as the second signature, determining that the URL is authentic; and
in response to the first signature being different from the second signature, determining that the URL is not authentic.

14. The electronic device according to claim 10, wherein the identifier of the target signature algorithm is a name of the target signature algorithm or a name of the script.

15. A non-transitory computer readable storage medium, storing a computer program which causes a computer to perform:

obtaining a script corresponding to a dynamic part of a target signature algorithm, the script comprising at least one script application programming interface (API);

encapsulating at least one general API of a static part of the target signature algorithm, the at least one script API having a mapping relationship with the at least one general API;

by combining the script with the static part based on the mapping relationship between the at least one script API and the at least one general API, generating the target signature algorithm;

compiling the target signature algorithm;

storing an identifier of the target signature algorithm and a compilation result of the target signature algorithm into a hash table:

obtaining a hyper text transfer protocol (HTTP) request sent by a client, the HTTP request comprising: a uniform resource locator (URL), a first signature, and an access key, and the first signature being obtained by signing the URL with the target signature algorithm and a secret key;

determining the secret key corresponding to the access key;

looking up the target signature algorithm in the hash table;

by signing the URL based on the target signature algorithm and the secret key, obtaining a second signature; and verifying authenticity of the URL based on the first signature and the second signature.

* * * * *